(12) United States Patent
Hand, III et al.

(10) Patent No.: US 9,909,490 B2
(45) Date of Patent: Mar. 6, 2018

(54) METHODS AND SYSTEMS FOR BOOST CONTROL

(71) Applicant: Ford Global Technologies, LLC, Dearborn, MI (US)

(72) Inventors: Michael J. Hand, III, Ypsilanti, MI (US); Thomas Alan Brewbaker, Plymouth, MI (US); Michiel J. Van Nieuwstadt, Ann Arbor, MI (US); Brien Lloyd Fulton, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 15/080,195

(22) Filed: Mar. 24, 2016

(65) Prior Publication Data
US 2017/0276067 A1    Sep. 28, 2017

(51) Int. Cl.
| | | |
|---|---|---|
| *F02B 33/44* | (2006.01) | |
| *F02M 25/07* | (2006.01) | |
| *F02D 23/00* | (2006.01) | |
| *F02B 37/24* | (2006.01) | |
| *F02B 37/18* | (2006.01) | |
| *F02D 41/00* | (2006.01) | |

(Continued)

(52) U.S. Cl.
CPC ............ *F02B 37/24* (2013.01); *F02B 37/183* (2013.01); *F02D 41/0007* (2013.01); *F02D 41/0052* (2013.01); *F02D 41/021* (2013.01); *F02D 41/1402* (2013.01); *F02D 41/1444* (2013.01); *F02D 41/1448* (2013.01)

(58) Field of Classification Search
CPC ........ F02B 37/24; F02B 37/18; F02B 37/183; F02D 41/0007; F02D 41/0052; F02D 41/021; F02D 41/1402; F02D 41/1444; F02D 41/1448

USPC ................. 60/605.2, 602; 701/108
See application file for complete search history.

(56) References Cited

U.S. PATENT DOCUMENTS

| | | | | |
|---|---|---|---|---|
| 5,174,119 A | * | 12/1992 | Hanauer | F02B 37/24 60/602 |
| 5,850,737 A | * | 12/1998 | Aschner | F02B 37/24 60/602 |
| 6,067,800 A | | 5/2000 | Kolmanovsky et al. | |

(Continued)

FOREIGN PATENT DOCUMENTS

WO    2014003716 A2    1/2014

OTHER PUBLICATIONS

Wahlström, J. et al., "EGR-VGT Control and Tuning for Pumping Work Minimization and Emission Control," IEEE Transactions on Control Systems Technology, Jul. 2010, pp. 993-1003, vol. 18, No. 4, 11 pages.

(Continued)

*Primary Examiner* — Thai Ba Trieu
(74) *Attorney, Agent, or Firm* — Julia Voutyras; McCoy Russell LLP

(57) ABSTRACT

Methods and systems are provided for pressure control in a boosted engine system. A variable geometry turbine (VGT) geometry, and/or wastegate (WG), and/or an exhaust gas recirculation (EGR) valve opening is adjusted at least based on a difference between the exhaust pressure and an intake pressure in order to reduce the difference between exhaust and intake manifold pressures, thereby reducing pumping work losses.

16 Claims, 5 Drawing Sheets

(51) Int. Cl.
    *F02D 41/02*     (2006.01)
    *F02D 41/14*     (2006.01)

(56) References Cited

U.S. PATENT DOCUMENTS

| | | | |
|---|---|---|---|
| 6,155,049 A * | 12/2000 | Bischoff | F02B 37/24 60/602 |
| 6,604,361 B2 | 8/2003 | Buckland et al. | |
| 6,662,562 B2 * | 12/2003 | Engel | F02B 37/24 60/602 |
| 6,672,060 B1 | 1/2004 | Buckland et al. | |
| 6,715,287 B1 * | 4/2004 | Engel | F02D 41/0007 60/602 |
| 7,174,250 B2 * | 2/2007 | Barba | F02D 41/0072 701/108 |
| 7,536,249 B2 | 5/2009 | Müller | |
| 7,905,091 B2 * | 3/2011 | Kassner | F02B 37/18 60/602 |
| 7,918,090 B2 * | 4/2011 | Suzuki | F02B 37/18 60/602 |
| 2013/0226435 A1 | 8/2013 | Wasberg et al. | |
| 2014/0174073 A1 | 6/2014 | Kamik et al. | |
| 2014/0227109 A1 * | 8/2014 | Wang | F02B 37/18 417/53 |

OTHER PUBLICATIONS

Zentner, S. et al., "A cascaded control structure for air-path control of diesel engines," Journal of Automobile Engineering, 2014, pp. 799-817, vol. 228(7), 19 pages.

* cited by examiner

METHODS AND SYSTEMS FOR BOOST CONTROL

FIELD

The present description relates generally to methods and systems for pressure control in a boosted engine system.

BACKGROUND/SUMMARY

Engine systems may be configured with boosting devices, such as turbochargers or superchargers, for providing a boosted aircharge and improving peak power outputs, fuel economy and emissions. Turbochargers may have a variable geometry turbine (VGT) wherein the impeller blades (or vanes) of the turbine are regulated to vary boost pressure and exhaust pressure. A position of the impeller blades of the VGT may be varied based on a plurality of factors including engine speed, torque demand, desired response time, fuel economy, intake and exhaust manifold pressure, and emissions requirements. By varying an aspect ratio of the turbocharger, the VGT adjustment enables pumping losses to be reduced.

One example approach for adjusting VGT geometry is shown by Buckland et al. in U.S. Pat. No. 6,672,060. Therein, VGT geometry is adjusted via a feedback control loop taking into account a difference between an actual intake manifold pressure and a desired intake manifold pressure.

However, the inventors have recognized potential issues with the above approach. As one example, it may not be possible to sufficiently optimize pumping work and the occurrence of exhaust pressure spikes. In particular, during transient and off idle engine operation, for example during tip-in and tip-out events, there may be exhaust pressure spikes caused by rapid changes in the flow of gases into the exhaust manifold without a corresponding change in the flow of gases out of the exhaust manifold resulting in an increase in the exhaust manifold pressure. Accordingly an increase in the pressure difference between the exhaust and intake manifold may be observed. Typically pressure control in the intake and exhaust manifold is performed based on the intake manifold pressure which reacts to changes and disturbances more slowly than the exhaust manifold pressure (due to larger intake manifold volume compared to smaller exhaust manifold volume and because disturbances such as fueling changes first impact the exhaust manifold and only afterwards reach the intake manifold). Under such circumstances, the VGT (or exhaust gas recirculation) actuator is not adjusted to increase the exhaust manifold outflow until the pressure increase is observed in the intake pressure, during which time the exhaust pressure may have rapidly increased to undesirable levels. During this time, high exhaust manifold pressure and exhaust pressure spikes result in an increase in the delta pressure across an engine, increasing engine pumping work which may adversely affect engine efficiency, performance, emissions, and fuel economy. Also during this time, the expansion ratios of the turbine may increase excessively which may cause damage to the turbocharger hardware. In addition, such exhaust pressure spikes and high expansion ratios may lead to high cycle fatigue and eventually degradation of several engine components, such as seals, gaskets, exhaust valves and cylinder components.

The inventors herein have identified an approach by which the issues described above may be at least partly addressed. One example method for exhaust pressure control includes a method for a boosted engine system comprising: adjusting a variable geometry turbine (VGT) based on each of an engine speed, an exhaust pressure, and a difference between the exhaust pressure and an intake pressure to maintain a desired delta pressure and boost pressure. The inventors herein have recognized that by monitoring the pressure difference (delta pressure) between an exhaust and an intake manifold and adjusting the VGT geometry based on the pressure difference, VGT adjustments can be scheduled more effectively to reduce the occurrence of high delta pressures across the engine and subsequently high exhaust pressure and exhaust pressure spikes. In addition, EGR can be leveraged to reduce the pumping work by adjusting the opening of the EGR valve in order to increase EGR flow from the exhaust manifold to the intake manifold, thereby reducing exhaust manifold pressure and engine pumping work.

In one example, during transient engine operations, at least one of VGT vane actuator, wastegate valve, and EGR valve may be adjusted to control the pressure difference across an engine, thereby controlling/reducing engine pumping work, exhaust pressure spikes, and excessive expansion ratios. As an example, the position of a VGT vane, wastegate valve opening, and/or an EGR valve opening may be continuously adjusted based on actual pressure difference between an exhaust and an intake manifold to reduce a pressure difference across the engine between the intake and exhaust pressure. In particular, in addition to an existing proportional-integral (PI) controller (for example control based on boost pressure error from a desired boost pressure or exhaust pressure error from a desired exhaust pressure and other signals), a proportional-derivative (PD) controller (control based on a difference between exhaust and intake manifold pressure) may be used to adjust at least one of VGT vanes, EGR valve, and wastegate valve opening in order to maintain an optimal pressure difference (or reduce excessive pressure differences) between the exhaust and intake manifold. The PD controller may receive signals including pressure difference between exhaust and intake manifold, intake and exhaust manifold pressure, flow and engine speed from the respective sensors and these signals may be utilized for adjusting the VGT vane actuator, the wastegate valve, and/or the EGR valve position. In one example, gains may increase based on an increase in engine speed and/or an increase in exhaust pressure, resulting in an increase (both magnitude and rate of increase) in the opening of the VGT vanes, wastegate valve, and/or the EGR valve. Similarly, gains may decrease based on a decrease in engine speed and/or a decrease in exhaust pressure, resulting in a decrease in the opening of the VGT vanes, wastegate valve, and/or the EGR valve. As the VGT is coupled to the exhaust manifold, by increasing the opening of the VGT vanes via actuation of a VGT actuator it is possible to vary the VGT aspect ratio and thereby reduce exhaust pressure and spikes in exhaust pressure with little effect on intake manifold pressure. Likewise, as the EGR valve opening is located at the exhaust manifold, exhaust pressure may be effectively reduced by increasing EGR valve opening. Similarly, by routing exhaust via a wastegate passage (the opening of which is controlled by a wastegate valve), exhaust pressure spikes may be decreased. In alternate examples, a ratio between exhaust and intake pressure may be used by the control system to adjust the VGT and EGR openings simultaneously.

In this way, VGT geometry (vanes), wastegate valve position, and/or EGR valve position may be effectively adjusted via their respective actuators in order to reduce the difference between the exhaust manifold pressure and intake manifold pressure of a boosted engine. By adjusting based on engine speed, pressure difference between the exhaust and intake manifold (delta pressure), and exhaust pressure so as to control the difference between the exhaust and intake manifold pressure, engine pumping losses may be optimized. In addition, exhaust pressure spikes and excessive expansion ratios may be avoided thereby enhancing engine performance and fuel efficiency. By varying the gains as a function of engine speed and exhaust pressure, along with the difference between an exhaust and intake manifold as the control input, the controller may more aggressively control the VGT vanes, wastegate valve position, and EGR valve positions as the pressure difference increases or decreases. In one example, if the pressure difference is small, the controller may provide minor adjustments to the VGT and EGR actuators. In another example, if the pressure difference increases beyond a threshold, the controller may aggressively adjust the actuators in order to reduce the pressure difference, such as with a higher gain tuning. The technical effect of controlling delta pressure across the engine is reduced engine pumping losses, reduced/decreased exhaust pressure spikes, and reduced excessive expansion ratios is that damage to turbocharger and other hardware components due to fatigue may be reduced and further, emissions, performance, and fuel economy may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
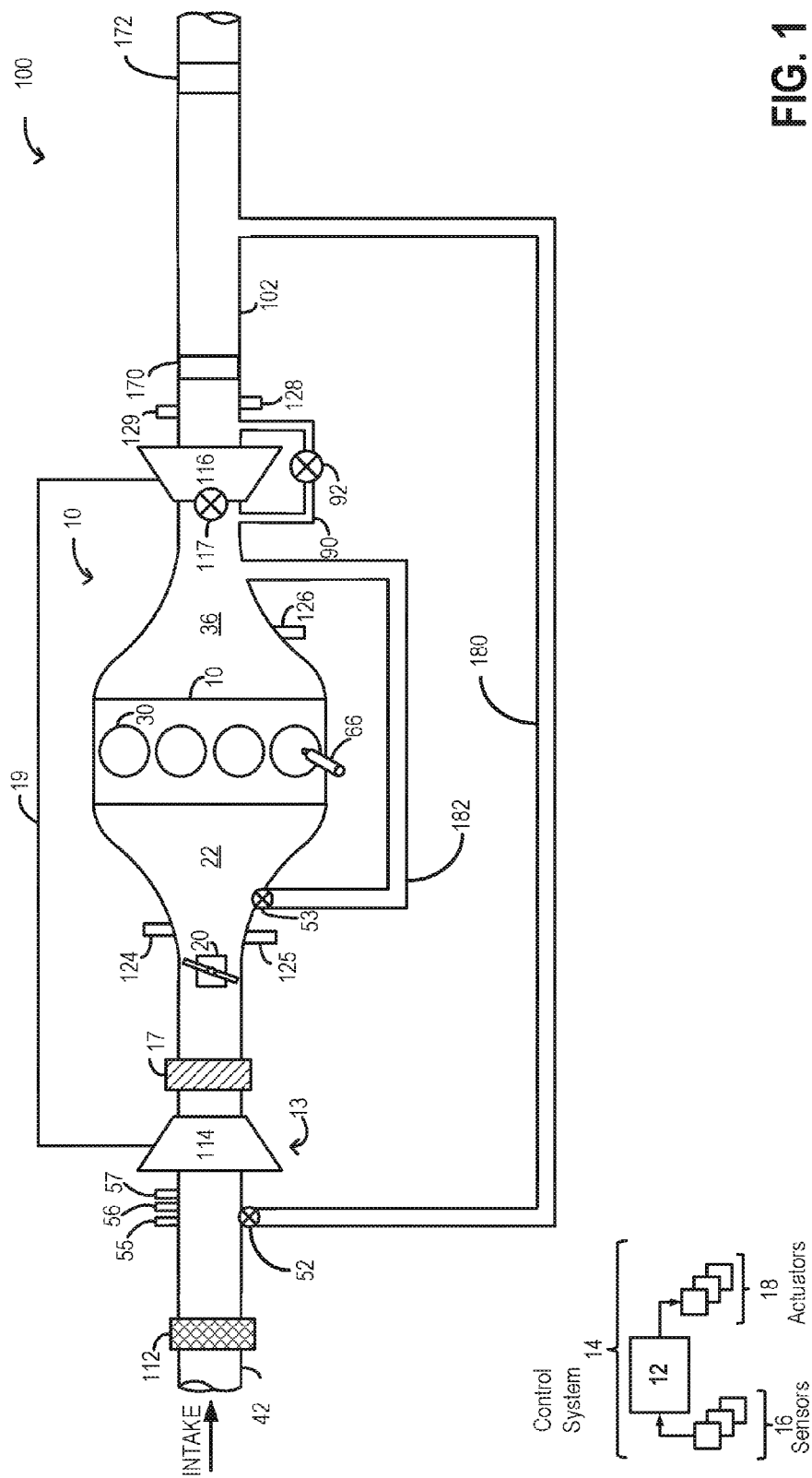
FIG. 1 shows a schematic diagram of an example engine system including a variable geometry turbocharger and an exhaust gas recirculation system.
Figure 3:
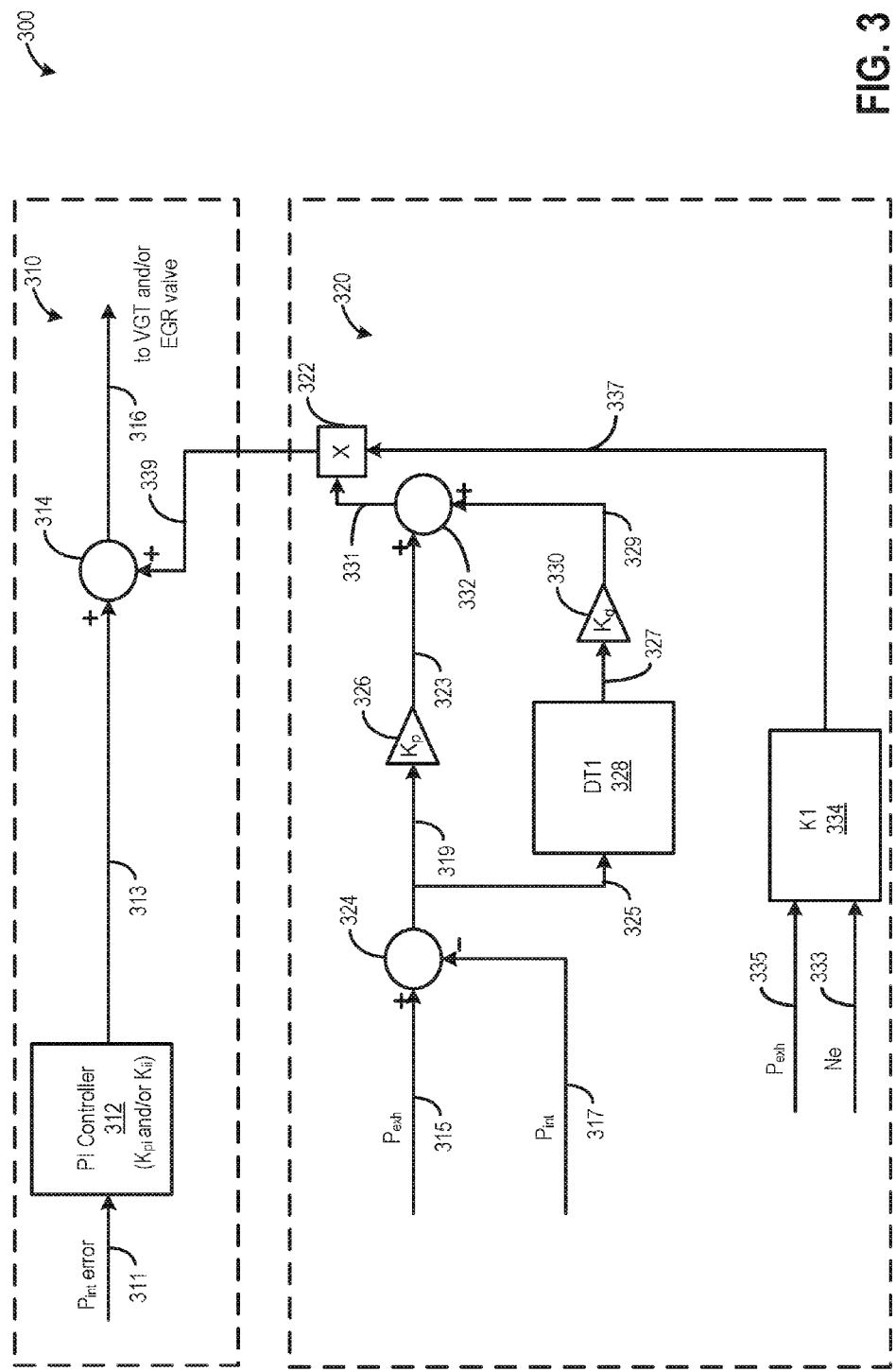
FIG. 3 shows a block diagram of an example control system that may be used for adjusting VGT vanes, wastegate valve, and/or EGR valve positions.
Figure 4:
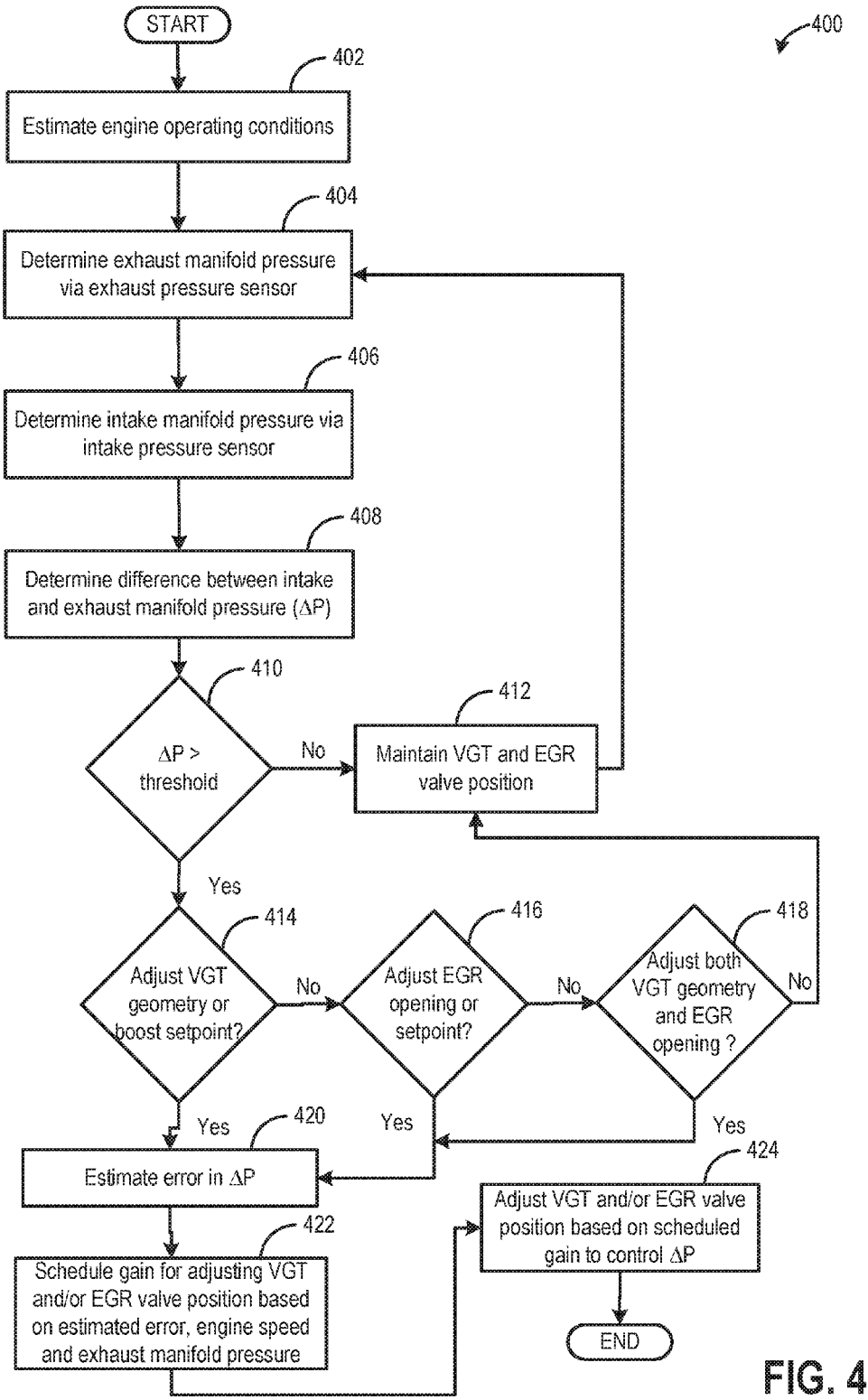
FIG. 4 shows a flow chart illustrating a method that can be implemented for boost control and reduction in a pressure difference between exhaust and intake manifold.
Figure 5:
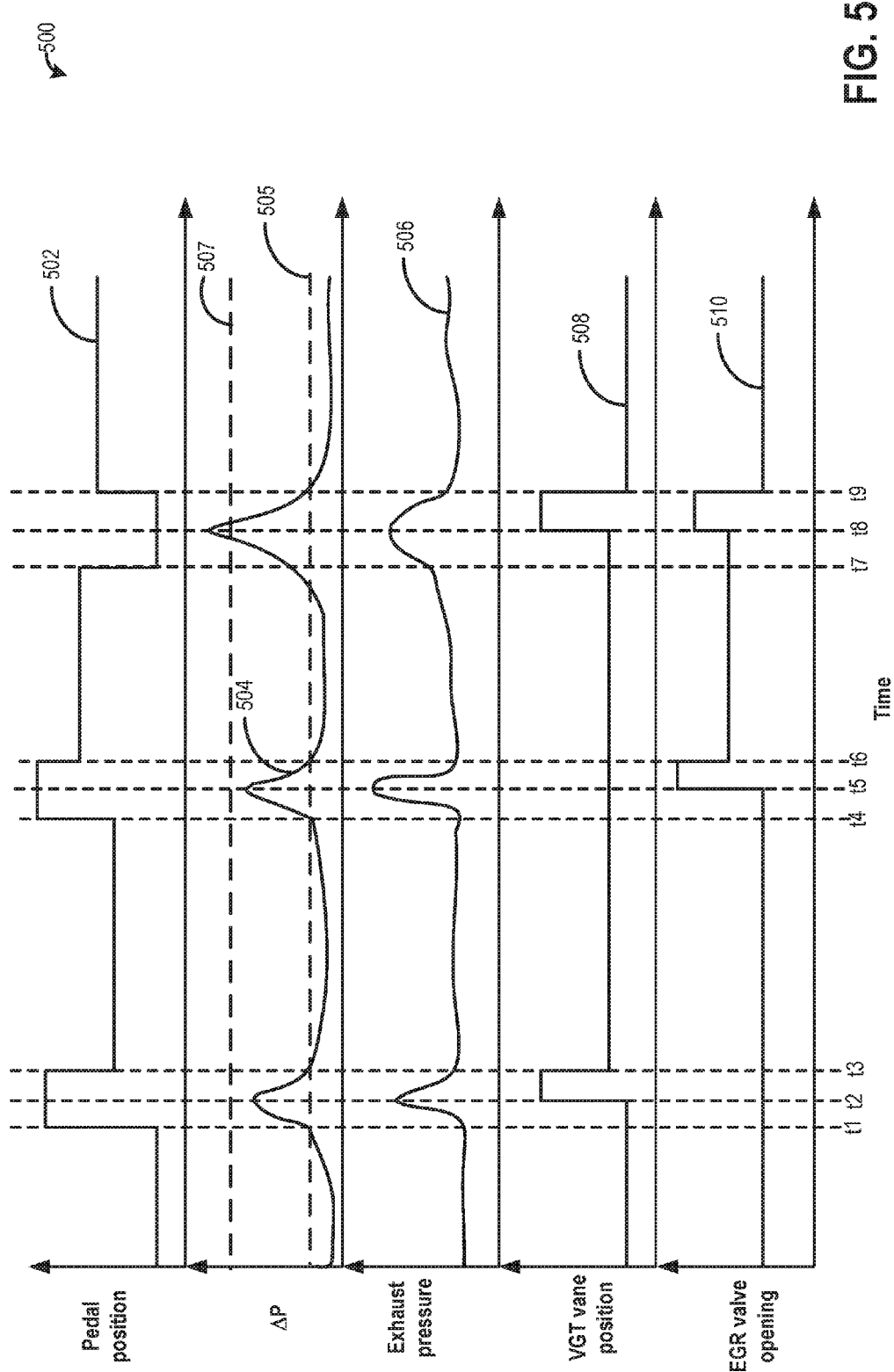
FIG. 5 shows an example control of pressure difference between exhaust and intake manifold via VGT and/or EGR valve position adjustment.

The following description relates to systems and methods for pressure control in a boosted engine system. An example engine boosted system including a variable geometry turbine (VGT) and an exhaust gas recirculation (EGR) system is shown in FIG. 1. Opening of the VGT and EGR valves may be feedback controlled by an engine controller based on a plurality of input signals including intake and exhaust manifold pressure, engine speed and fueling schedule, as is shown in the example control system of FIG. 2. In addition to a PI controller (proportional-integral) controller, a gain-scheduled PD (proportional-derivative) controller, as shown in FIG. 3, may be used to further adjust at least one of VGT vane position, wastegate valve position, and EGR valve openings based on engine speed, exhaust manifold pressure and a difference between exhaust and intake manifold pressure (delta pressure). An engine controller may be configured to perform a control routine, such as the example routine of FIG. 4 for reduction in a pressure difference between exhaust and intake manifolds via adjustments of VGT and/or EGR valve positions. Example adjustments to VGT and EGR valve positions in response to an increase in the pressure difference between the exhaust and intake manifolds, is shown in FIG. 5.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

The compressor 114 may be coupled, through charge-air cooler (CAC) 17 to throttle valve 20. Throttle valve 20 is coupled to engine intake manifold 22. From the compressor, the compressed air charge flows through the charge-air cooler 17 and the throttle valve to the intake manifold. A compressor recirculation passage (not shown) may be provided for compressor surge control. Specifically, to reduce compressor surge, such as on a driver tip-out, boost pressure may be dumped from the intake manifold, downstream of the CAC 17 and upstream of throttle valve 20, to intake passage 42. By flowing boosted air from upstream of an intake throttle inlet to upstream of the compressor inlets, boost pressure may be rapidly reduced, expediting boost control. Flow through compressor recirculation passage may be regulated by adjusting the position of a compressor recirculation valve (not shown) positioned therein. The compressor recirculation valve may be a continuously variable valve whose position can be adjusted to a fully open position, a fully closed position, or any position therebetween. Thus recirculation valve may also be referred to as a continuously variable compressor recirculation valve, or CCRV.

The exhaust turbine 116 may be configured as a variable geometry turbine (VGT). The VGT may include a valve 117 which may be adjusted to change the aspect ratio and position of the impeller blades (vanes) of the VGT. As an example, by opening the VGT vanes via a VGT actuator, the aspect ratio of the VGT may be increased, thereby increasing the surface area of the VGT exposed to the exhaust gas flow. Therefore, by varying the opening of the valve 117, the engine controller 12 may vary the level of energy that is obtained from the exhaust gas flow and imparted to the corresponding compressor. A wastegate valve 92 may be actuated open to dump at least some exhaust pressure from upstream of the turbine to a location downstream of the turbine via a bypass passage 90. By reducing exhaust pressure upstream of the turbine, turbine speed can be reduced, which in turn may facilitate reduction in compressor surge and overboosting issues.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

In some examples, intake manifold 22 may include an intake manifold pressure sensor 124 for estimating a manifold pressure (MAP) and/or an intake air flow sensor 125 for estimating a mass air flow (MAF) in the intake manifold 22. Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust passage 102 after passing through a muffler 172. A low pressure exhaust gas recirculation (LP-EGR) delivery passage 180 may be coupled to the exhaust passage 102 at a location upstream of emission control device 170. A portion of exhaust gas from the exhaust pipe 102 may be delivered from downstream of the turbocharger turbine 116 to the engine intake manifold 22, upstream of a turbocharger compressor 114 as LP-EGR. Opening of an EGR valve 52 may be regulated to control the flow of exhaust from the exhaust passage 102 to the intake manifold 22 via the EGR passage 180. EGR valve 52 may be opened to admit a controlled amount of exhaust gas to the compressor inlet for desirable combustion and emissions control performance. The engine may further comprise a high pressure EGR (HP-EGR) system wherein a portion of exhaust gas from the exhaust pipe 102 may be delivered from upstream of a turbocharger turbine 116 to the engine intake manifold 22, downstream of a turbocharger compressor 114 via HP-EGR passage 182. Flow of HP-EGR may be regulated by adjusting the opening of an HP-EGR valve 53. EGR valves 52 and 53 may be configured as a continuously variable valves. In an alternate example, however, EGR valves 52 and 53 may be configured as an on/off valve.

One or more sensors may be coupled to EGR passages 180 and 182 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, and humidity sensors 55-57, and/or an air-fuel ratio sensor coupled to the compressor inlet. In one example, the air-fuel ratio sensor is an oxygen sensor.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include MAP sensor 124, MAF sensor 125, exhaust temperature sensor 128, exhaust pressure sensor 129, compressor inlet temperature sensor 55, compressor inlet pressure sensor 56, compressor inlet humidity sensor 57, exhaust gas sensor 126 located upstream of emission control device 170, crankshaft sensor, and EGR sensor. Other sensors such as additional pressure, temperature, air/fuel ratio, and composition sensors may be coupled to various locations in engine system 100. The actuators 81 may include, for example, throttle 20, EGR valve 52, VGT valve 117, wastegate 92, and fuel injector 66.

The control system 14 may include a controller 12. The controller 12 may receive input data from the various sensors, process the input data, and trigger various actuators in response to the processed input data based on instruction or code programmed therein corresponding to one or more routines. Controller 12 may include a proportional integral (PI) or a proportional integral derivative (PID) controller. For example, the controller may receive an indication of exhaust and intake manifold pressure and engine speed from respective sensors and based on these signals the controller may adjust at least one of the VGT vane position, wastegate valve and the EGR valve opening via the respective actuators. By making adjustments to the VGT geometry and EGR flow rate, it is possible to control boost, reduce exhaust pressure spikes, and reduce a pressure difference between the exhaust and intake manifold (herein also referred to as the delta pressure). In addition to the PI controller, a proportional-derivative (PD) controller (or a proportional controller) may be used for adjusting at least one of VGT geometry, wastegate valve and EGR valve opening in order to reduce engine pumping work and limit turbine expansion ratio. Detailed description of the mentioned controllers is discussed with regard to FIGS. 2, 3, and 4.

FIG. 1 shows an example configuration of an internal combustion engine with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 2:
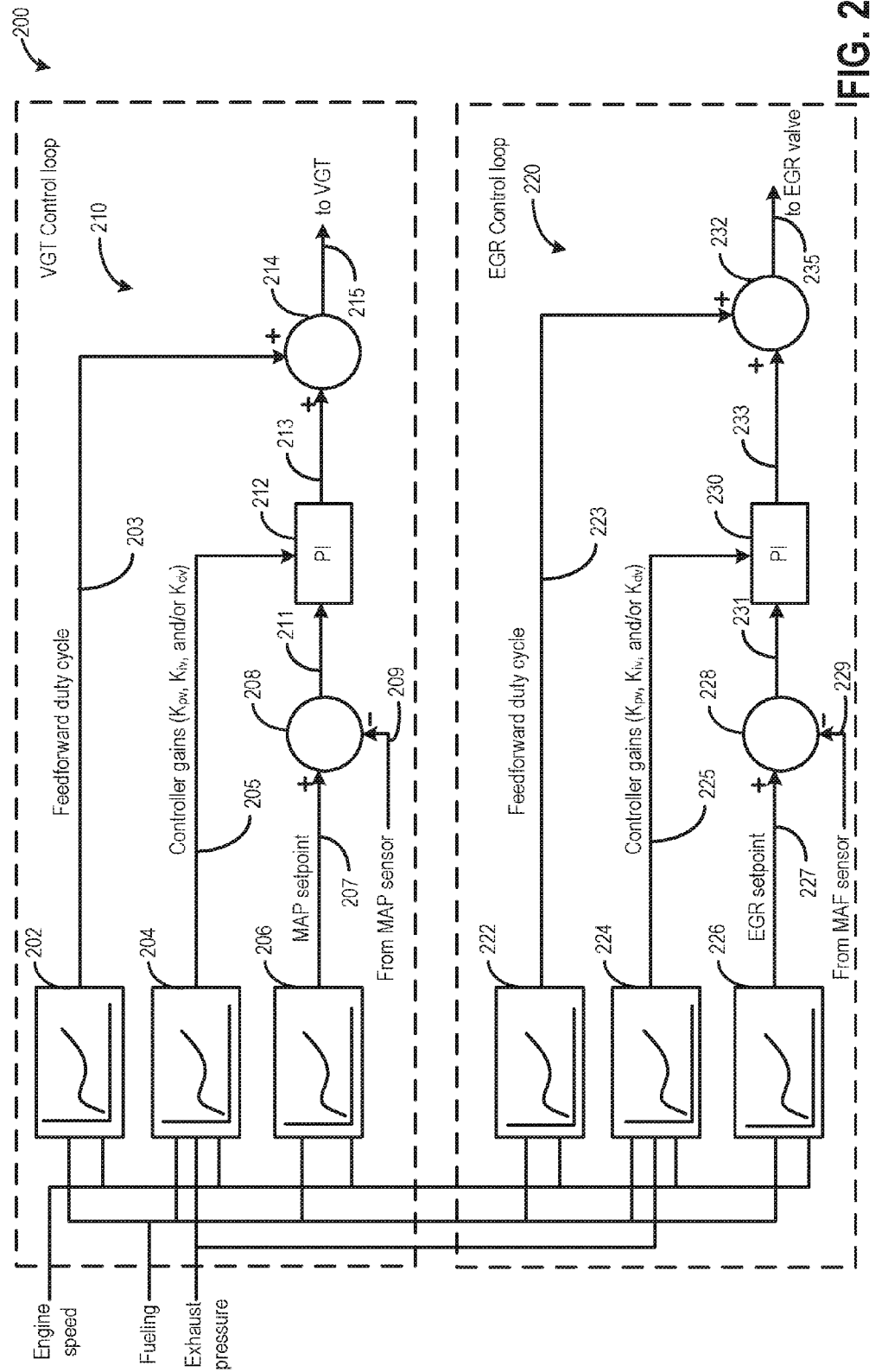
FIG. 2 shows a block diagram of two example control systems that may be used for adjusting each of VGT vane position and EGR valve opening.

FIG. 2 shows an example proportional-integral (PI) control scheme 200 that may be implemented by a controller (e.g., controller 12 as shown in FIG. 1) to adjust each of a valve controlling the geometry of a variable geometry turbine (e.g., valve 117 for controlling VGT 116 as shown in FIG. 1) and an EGR valve (e.g., EGR valve 52 coupled to LP-EGR passage 180 as shown in FIG. 1 and EGR valve 53 coupled to HP-EGR passage 182) controlling airflow through an exhaust gas recirculation (EGR) passage. It should be appreciated that in the description herein, a signal (duty cycle) may refer to an electrical signal such as an electric current, and that modification of a signal may refer to a change in voltage corresponding to the electric current.

The control scheme 200 includes two separate control loops namely a VGT control loop 210 and an EGR control loop 220. The two control loops may utilize one or more common inputs including engine speed, fueling, and exhaust pressure for controlling VGT and EGR valves respectively. In addition, each control loop may have distinct non-overlapping inputs.

The VGT control loop 210 may include a feedforward segment. In the feedforward segment, a first signal corresponding to engine speed as obtained from a crankshaft sensor and a second signal corresponding to a fueling schedule may be used as inputs to a look-up table 202. In a first control segment, a signal 203 indicating a desired VGT opening may be output based on look-up table 202. In one example, for a given fuel schedule, as the engine speed increases, the desired VGT opening may increase/decrease. In another example, for a given engine speed, as the amount of fuel required increases, the desired VGT opening may increase/decrease. The VGT control loop may further include a second control segment for scheduling gains for the VGT adjustment. For scheduling gains, in addition to engine speed and fueling schedule, exhaust pressure as obtained from an exhaust pressure sensor (e.g., exhaust pressure sensor 129 in FIG. 1) may be used as input to a look-up table 204. Based on the input parameters, a signal 205 indicating controller gains may be generated. This signal 205 may then be fed to a controller 212. The controller 212 may be a proportional-integral (PI) controller, proportional-integral-derivative (PID) controller or a proportional-derivative (PD) controller.

Further, a feedback segment (or closed loop segment) may be incorporated in the VGT control loop. A subtractor 208 may receive as inputs a setpoint (desired) intake manifold pressure 207 based on a look-up table 206 receiving engine speed and fueling schedule as inputs, and an estimate of the actual intake manifold pressure 209 from a MAP sensor (such as MAP sensor 124 in FIG. 1). The subtractor 208 may compute a difference between the setpoint intake manifold pressure and the actual intake manifold pressure. Based on this difference, the subtractor 208 may compute a MAP error 211. At the PI controller, MAP error 211 may be processed with the controller gains signal 205. The signals may be processed and/or modified by a proportional gain ($K_{pv}$) and/or by an integral gain ($K_{iv}$). In one example, the controller 212 is a PD controller or a derivative (D) controller, wherein the signals may be processed by a derivative gain ($K_{dv}$).

The adder 214 may receive the proportional term and/or the integral term via signal 213 and the feed-forward term (e.g., a duty cycle) via the signal 203. Based on the received signals, the adder 214 may output a signal 215 to an actuator coupled to the VGT vanes. The signal 215 may be used to adjust the VGT geometry via adjustments to the positions of the VGT vane. As such, the signal 215 may correspond to the power to be supplied to the actuator coupled to the VGT vanes for adjustment of the vanes. For a VGT coupled to the exhaust manifold, exhaust pressure may be regulated by varying the geometry of the VGT vane. As an example, by opening the VGT vanes the aspect ratio of the VGT may be increased and consequently exhaust pressure may be lowered. Similarly, by closing the VGT vanes the aspect ratio of the VGT may be decreased and consequently exhaust pressure may be increased. In this way, by adjusting the geometry of the VGT vane, it is possible to limit exhaust pressure spike and maintain an optimal pressure difference between the intake and exhaust manifolds, thereby reducing engine pumping work. The efficiency of the compressor coupled to the VGT is high within a certain window in the compressor map. The compressor may choke or surge when operated beyond the choke and surge line respectively. Adjustments to VGT geometry may be further carried out taking into account the compressor choke and surge limits. In one example, if a current compressor pressure ratio is close to the surge line, VGT vanes may be not be opened any further such that the possibility of compressor surge may be reduced. In another example, during a tip-out event, if a current compressor pressure ratio is close to the surge line, VGT vanes and EGR valve position may be opened simultaneously in order to provide a serial path for exhaust flow (backwards through the EGR) to both reduce the compressor pressure ratio and increase the flow across the compressor.

Similar to the VGT control loop 210, the EGR control loop 220 may also include a feedforward segment. In the feedforward segment, a first signal corresponding to engine speed as obtained from a crankshaft sensor and a second signal corresponding to a fueling schedule may be used as inputs to a look-up table 222. In a first control segment, a signal 223 indicating a desired EGR valve position (governing EGR flowrate) may be output based on look-up table 222. In one example, for a given fuel schedule, as the engine speed increases, the desired EGR valve opening may increase/decrease. In another example, for a given engine speed, as the amount of fuel required increases, the desired EGR valve opening may increase/decrease. The EGR control loop may further include a second control segment for scheduling gains for the EGR flowrate adjustment. The EGR control loop may further include a second control segment for scheduling gains for the EGR flowrate adjustments via adjustments to the EGR valve. For scheduling gains, in addition to engine speed and fueling schedule, exhaust pressure as obtained from an exhaust pressure sensor (e.g., exhaust pressure sensor 129 in FIG. 1) may be used as input to a look-up table 224. Based on the input parameters, a signal 225 indicating controller gains may be generated. This signal 225 may then be fed to a controller 230. The controller 230 may be a proportional-integral (PI) controller, proportional-integral-derivative (PID) controller or a proportional-derivative (PD) controller.

Further, a feedback segment (or closed loop segment) may be incorporated in the EGR control loop. A subtractor 228 may receive as inputs a setpoint (desired) EGR flowrate 227 based on a look-up table 226 receiving engine speed and fueling schedule as inputs, and intake manifold pressure, and an estimate of the actual EGR flowrate 229 and intake manifold pressure from a MAF sensor (such as MAF sensor 125 in FIG. 1) and/or a MAP sensor (such as the MAP sensor 124 in FIG. 1). The subtractor 228 may compute a difference between the setpoint EGR flowrate (and/or pressure) and the actual EGR flowrate (and/or intake manifold pressure, setpoint and actual). Based on this difference, the subtractor 228 may compute a MAF error 231. At the PI controller, MAF error 231 may be processed with the controller gains signal 225. The signals may be processed and/or modified by a proportional gain ($K_{pv}$) and/or by an integral gain ($K_{iv}$) and/or by a derivative gain ($K_{dv}$).

The adder 232 may receive the proportional term and/or the integral term via signal 233 and the feed-forward term (duty cycle) via the signal 223. Based on the received signals, the adder 232 may output a signal 235 to an actuator coupled to the EGR valve. The signal 235 may be used to adjust the airflow in the EGR system via adjustments to the EGR valve opening. As such, the signal 235 may correspond to the power to be supplied to the actuator coupled to the EGR valve for adjusting the opening of the valve. As EGR is delivered from the exhaust manifold to the intake manifold, exhaust pressure may be regulated by varying the opening of the EGR valve (vary EGR flowrate). As an example, by increasing the opening the EGR valve, a higher volume of exhaust gas may be recirculated thereby reducing exhaust pressure. In this way, by adjusting the EGR valve opening, it is possible to adjust EGR flowrate in order to limit exhaust pressure spikes and maintain an optimal pressure difference between the intake and exhaust manifolds, thereby reducing engine pumping work. Regulation of exhaust pressure may be carried out by adjusting EGR valve of at least one of a LP-EGR and a HP-EGR system. However, higher than desired levels of EGR flow may cause over dilution of intake manifold airflow and cause combustion instability. Therefore, EGR flow rate adjustments may be further carried out taking into account other engine operating parameters such as engine load, engine temperature, etc. Similar to VGT control loop 210 and the EGR control loop 220, a third control loop may regulate the opening of a wastegate valve coupled to a wastegate passage of an exhaust turbine. The wastegate valve opening may be adjusted based on boost pressure and boost error, the wastegate valve opening decreased as the demanded boost pressure increases.

FIG. 3 shows an example control scheme 300 which may be used by a vehicle controller (such as controller 12 in FIG. 1) for adjusting VGT vanes and/or EGR valve positions in response to change in at least one of a difference between an exhaust manifold and an intake manifold pressure, an engine speed, an exhaust and an intake manifold pressure. The control scheme 300 may be a modified version of the control scheme 200 in FIG. 2 that is optimized to control VGT and EGR valve positions, in particular, for boost control and reduction of engine pumping work (by reduction of the pressure difference between exhaust and intake manifolds). Therefore, in addition to a proportional-integral (PI) controller of FIG. 2, a proportional-derivative (PD) controller may be used to further adjust at least one of a VGT vane actuator, wastegate valve opening, and an EGR valve opening based a difference between an exhaust manifold and an intake manifold pressure, engine speed, and exhaust manifold pressure. Adjusting a VGT vane actuator, wastegate valve, and/or EGR valve includes determining a first term via a proportional integral (PI) controller based on engine speed, intake manifold pressure, and exhaust manifold pressure, and determining a second term via a proportional derivative (PD) controller based on a difference between an exhaust manifold and an intake manifold pressure, engine speed, and exhaust manifold pressure. Similar to FIG. 2, in the description herein, a signal may refer to an electrical signal such as an electric current, and that modification of a signal may refer to a change in voltage corresponding to the electric current.

The control scheme 300 may comprise two parts, a first part 310, and a second part 320. The first part 310 may be the VGT or EGR control loop 210 (or 220) used for scheduling the first term, as described in FIG. 2A. PI controller 312 may receive a difference ($P_{int}$ error) 311 in setpoint (desired) intake pressure and actual measured intake pressure as obtained from a manifold air pressure (MAP) sensor (such as the MAP sensor 124 in FIG. 1). In one example, the PI controller 312 may be the VGT control loop 210 or the EGR control loop 220 in FIG. 2. At the PI controller 312, the $P_{int}$ error 311 may be processed and/or modified (scaled) by a proportional gain ($K_{pi}$). The integral of the $P_{int}$ error 311 may be similarly processed and/or modified (scaled) by an integral gain ($K_{ii}$). One of these terms or their sum is then output to signal 313. The boost pressure (or EGR flow rate) control term 313 is then added with the proposed delta pressure control term 339 to produce the final control signal to be sent to the VGT or EGR actuator. In one example, the PI controller 312 may be a proportional integral derivative (PID) controller and in addition to a proportional gain and an integral gain may also process the $P_{int}$ error 311 using a derivative gain. However, instead of directly using the signal generated from the PI controller 312 for adjustment of VGT and/or EGR valve position, a second part 320 of the control scheme may be utilized to calculate a second term in order to optimize the control process.

In order to optimize the pressure difference between an exhaust manifold pressure and an intake manifold pressure, a first signal 315 comprising an actual measured exhaust manifold pressure ($P_{exh}$) as obtained from an exhaust pressure sensor (such as the exhaust pressure sensor 129 in FIG. 1) and a second signal 317 comprising an actual measured intake pressure as obtained from a manifold air pressure (MAP) sensor may be used as input to a controller (subtractor) 324 (to compute an error). Either of these signals may be instead estimated based on other measurements. The subtractor 324 may compute a difference between the exhaust and intake manifold pressure. The signals (319 and 325) corresponding to the difference computed by the subtractor 324 may be processed and/or modified separately by a proportional gain ($K_p$) 326. The signal 319 upon modification by a proportional gain ($K_p$) 326 may produce proportional term 323. In parallel, the signal 319 may be differentiated by a differentiator block (DT1) 328 and a differentiator output 327 and a derivative gain ($K_d$) 330 and a derivative term 329 may be generated.

The adder 332 may receive the proportional term 323 and the derivative term 329. Based on the received signals, the adder 332 may further compute a signal 331. In addition, a gain scheduling may be carried out taking into account engine speed and exhaust pressure. A first signal 335 comprising an actual measured exhaust manifold pressure ($P_{exh}$) as obtained from an exhaust pressure sensor and a second signal 333 comprising engine speed (Ne) as obtained from a crankshaft sensor may be used an inputs to a look-up table K1 334. Based on the input signals, the look-up table may schedule a gain 337. In one example, the scheduled gain may increase based on an in increase in engine speed and/or an increase in exhaust pressure. Similarly, the scheduled gain may decrease based on a decrease in engine speed and/or a decrease in exhaust pressure. The multiplier 322 receives the scheduled gain 337 and the signal 331 (computed by the adder 332) as input signals. In one example, increasing the gain 337 when the exhaust pressure 335 increases beyond a threshold allows the controller to respond more aggressively to larger (potentially more problematic/damaging) pressure spikes. Engine systems are nonlinear and may display different speeds of response at different engine operating regions, particularly based on engine speed. At higher engine speeds, the system responds more quickly to changes. Therefore, a less aggressive (smaller) gain 337 may be sufficient when the engine speed is high.

Based on the two input signals 331 and 337, the multiplier 322 may compute a signal 339 which may be used as a second input to the adder 314. As described before, the first input to the adder 314 may be the signal 313 comprising the proportional and the integral terms from the PI controller 312. The controller computes a signal 316 which may be utilized to adjust at least one of a VGT vane position, wastegate valve opening, and an EGR valve opening. An example representation of the signal 316 is shown in Equation 1.

$$VGT = \\ VGT_{from\ boost\ control} + K_{gain} \left[ K_p(p_{exhaust\ manifold} - p_{intake\ manifold}) + K_d \frac{d(p_{exhaust\ manifold} - p_{intake\ manifold})}{dt} \right] \quad (1)$$

Where, VGT is the signal 316 corresponding to the power to be supplied to an actuator coupled to at least one of VGT (or the EGR valve) for adjusting the position of the valve, $VGT_{from\ boost\ control}$ is the signal 313 as received from the PI controller 312, $K_p(p_{exhaust\ manifold} - p_{intake\ manifold})$ is the proportional term 323 as received from the PD controller, $$K_d \frac{d(p_{exhaust\ manifold} - p_{intake\ manifold})}{dt}$$

is the derivative term 329 as received from the PD controller, and $K_{gain}$ is the signal 337 that is determined based on the lookup table(s) 334.

The second part 320 comprises a PD controller (no integral control) therefore it is effective in transient conditions only. The integral action of the base boost controller (PI controller 312) recovers the mapped setpoint. In this way, a first term determined by a PI controller and a second term determined by a PD controller may be added to selectively adjust each of the VGT vane actuator (during first condition), the EGR valve (during second condition) and the wastegate valve opening (during third condition). Calculation of the first term is based on inputs (such as those in 210 or 220 in FIG. 2) including engine speed, intake manifold pressure, and exhaust manifold pressure. Further, the second term includes a first and a second component, wherein the first component depends on intake manifold pressure and exhaust manifold pressure and the second component depends on engine speed and exhaust manifold pressure. Selectively adjusting during the first condition includes actuating the VGT vane actuator to increase an opening the VGT vanes based on each of the first and the second term to increase an aspect ratio of the VGT, and wherein the selectively adjusting during the second condition includes opening the EGR valve based on each of the first and the second term to increase an opening of an EGR passage, and the selectively adjusting during the third condition includes opening the wastegate valve based on each of the first and the second gain to increase an opening of a wastegate passage.

As an example, by opening the VGT vanes, exhaust pressure may be lowered and by closing the VGT vanes, exhaust pressure may be increased. Similarly, by increasing the opening the EGR valve (LP-EGR and/or HP-EGR), a higher volume of exhaust gas may be recirculated thereby reducing exhaust pressure. By adjusting at least one of the VGT vane position, wastegate valve opening, and the EGR valve opening, it is possible to limit exhaust pressure spikes and maintain an optimal pressure difference between the intake and exhaust manifolds, thereby reducing engine pumping work. FIG. 4 illustrates an example method 400 for boost control and reduction of a pressure difference between exhaust and intake manifold via adjustments of VGT and/or EGR valve positions. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, engine operating conditions may be determined by the controller. The engine operating conditions may include engine load, engine temperature, engine speed, operator torque demand, etc. Depending on the estimated operating conditions, a plurality of engine parameters including rate of exhaust gas recirculation (EGR) flow, boost pressure, etc., may be determined. At 404, a current value of exhaust manifold pressure may be estimated from an exhaust pressure sensor (such as the exhaust pressure sensor 129 in FIG. 1) coupled to the exhaust manifold of the engine. The exhaust pressure may vary based on engine operating conditions and further based on parameters such as EGR flowrate, turbine geometry (in case of a variable geometry turbine), etc. At 406, a current value of intake manifold pressure may be determined from an intake manifold air pressure sensor (such as the MAP sensor 124 in FIG. 1) coupled to the intake manifold of the engine downstream of the compressor inlet.

At 408, a difference (ΔP) between the exhaust and intake manifold pressure may be computed by the controller. The pressure difference ΔP may be minimized in order to ensure optimal pumping work for the engine. The pressure difference ΔP may increase substantially due to exhaust pressure spikes causing engine pumping losses. An increase in engine pumping work beyond a desired level may adversely affect engine efficiency, performance, and fuel economy. Also during this time, the expansion ratios of the turbine may increase excessively which may cause damage to the turbocharger hardware. In addition, such high exhaust pressure, exhaust pressure spikes and high expansion ratios may lead to high cycle fatigue and eventually degradation of several engine components. As described above, at least one of the EGR flow rate (EGR valve opening), wastegate valve opening, and the VGT geometry (VGT vane position) may be adjusted to regulate exhaust pressure and in turn reduce the pressure difference ΔP to the desired level (close to zero).

At 410, the routine includes determining if the pressure difference (ΔP) between the exhaust and intake manifold is higher than a threshold pressure difference level. If it is determined that the pressure difference ΔP is lower than the threshold pressure difference, it may be inferred that the engine pumping work is at a desired level. In order to maintain the pressure difference ΔP below the threshold pressure difference, at 412, VGT geometry (aspect ratio), and EGR valve position may be maintained in the current state.

If at 410, it is determined that the pressure difference ΔP is higher than the threshold, adjustments may be made to at least one of the VGT geometry and the EGR valve opening in order to decrease the pressure difference to a desired level. Increase in pressure difference ΔP may occur during transient operations (e.g., during tip-in and tip-out events) of the vehicle which may cause exhaust pressure spikes. The pressure difference ΔP may be decreased by further opening the VGT vanes and/or by increasing the opening of the wastegate valve or the EGR valve. It may be taken into account that change in pressure by change in VGT geometry is a slower process compared to a change in pressure accomplished by change in EGR valve opening.

At 414, the routine includes determining if adjustments are to be made only to VGT geometry or boost setpoint for regulation of the pressure difference ΔP. By changing the aspect ratio of the VGT, the flow area of the VGT exposed to the exhaust may be increased, thereby causing a change in exhaust pressure. Also, by changing the boost setpoint, exhaust pressure may be effectively reduced, thereby reducing the pressure difference ΔP. It is required to be taken into account that the efficiency of a compressor coupled to the VGT is high within a certain acceptable window in the compressor map. The compressor may choke or surge when operated beyond the choke and surge line (outside the acceptable window) respectively. Further adjustments to VGT geometry may be possible only if the updated corresponding compressor operation is estimated to be well within the acceptable window in the compressor map in order to reduce any possibility of compressor choke or surge. If during current operation, the compressor operation is close to either the surge or the choke line in the map, the VGT geometry may not be further adjusted for regulation of pressure difference ΔP. Also, under circumstances when the pressure difference ΔP is higher than a second threshold, adjustment to only VGT geometry may not be sufficient to decrease the pressure difference ΔP.

If it is determined that only VGT may not be adjusted for regulation of pressure difference ΔP, at 416, the routine includes determining if adjustments are to be made only to the EGR valve opening or EGR setpoint in order to reduce the pressure difference ΔP. By increasing the opening of the EGR valve it is possible to regulate pressure difference ΔP within a shorter time compared to pressure difference ΔP regulation by change in VGT geometry. Similarly, by changing the EGR setpoint, exhaust pressure may be effectively reduced, thereby reducing the pressure difference ΔP. However, based on engine operating parameters such as engine load, engine temperature etc., EGR flow rate may only be increased up to a threshold limit. Higher than desired levels of EGR flow may cause over dilution of intake manifold airflow thereby causing combustion instability. Therefore, if the current EGR levels are close to the upper threshold limit, the EGR valve opening may not be further increased for pressure difference ΔP regulation. Also, under circumstances when the pressure difference ΔP is higher than a second threshold, adjustment to only EGR valve opening may not be sufficient to decrease the pressure difference ΔP.

If it is determined that adjustments to one of VGT geometry (or boost setpoint) and EGR valve opening (or EGR setpoint) is not sufficient to regulate the current pressure difference ΔP, at 418, the routine includes determining if adjustments to each of the VGT geometry and the EGR opening are desired for reducing the pressure difference ΔP. Alternatively, it may be determined if adjustments to each of the boost setpoint and the EGR setpoint are desired for reducing the pressure difference ΔP. In one example, adjustments to both the VGT and EGR valves (or boost setpoint and EGR setpoint) are desired if the pressure difference ΔP is higher than the second threshold and adjustment to one of VGT geometry and EGR valve opening may not be sufficient to decrease the pressure difference ΔP. In another example, at least one of the VGT and the EGR may be operating close to its limit (compressor surge and choke limits for VGT and combustion stability for EGR) as governed by engine operating parameters and scope for further adjustments to the respective valves are limited. It may be determined that based on current engine operating conditions, current VGT, and EGR valve positions, neither one of VGT geometry and EGR valve opening may be adjusted for pressure difference ΔP reduction. Under such circumstances, at 412, VGT geometry, and EGR valve position may be maintained in the current state. In one example, adjustments to a wastegate valve opening may also be carried out in order to regulate the current pressure difference ΔP.

If it is determined at 414 that adjustments to only VGT geometry or boost setpoint may be carried out for pressure difference ΔP regulation, the routine moves to 420 wherein a difference in a desired pressure difference and an actual pressure difference (error in ΔP) may be estimated by the controller. From each of 416 and 418, the routine also proceeds to step 420. At 420, the controller may include a proportional-integral (PI) controller or a proportional-integral-derivate (PID) controller. The PI (or PID) controller may receive signals including engine speed, fueling schedule, intake, and exhaust pressure from the respective sensors as input parameters. Based on the input parameters and a difference (error) between a desired and an actual estimate of intake manifold pressure and/or intake manifold airflow, the PI controller may schedule required adjustments to VGT vane position, wastegate valve opening, and/or EGR valve opening in order to decrease the pressure difference ΔP to a desired level (close to zero). The operation of the PI controller has been discussed with reference to FIG. 2. In addition to the PI controller, a proportional-derivative (PD) controller may be used for adjusting at least one of a VGT vane actuator, wastegate valve opening, and an EGR valve opening. The PD controller may utilize a difference between exhaust and intake manifold pressure in order to reduce engine pumping work and limit turbine expansion ratio. The operation of the PD controller together with the PI controller has been described with reference to FIG. 3.

At 422, the PD controller together with the PI controller may adjust VGT geometry, wastegate valve position, and/or EGR valve position based on inputs including the error in ΔP (estimated by the controller in step 420), intake and exhaust manifold pressure and engine speed as received from the respective engine sensors. In one example, in a first mode, the aspect ratio of the VGT may be increased with at least one of a decrease in the engine speed and an increase in the exhaust pressure, and the aspect ratio of the VGT may be decreased with at least one of an increase in the engine speed and a decrease in the exhaust pressure. In a second mode, the aspect ratio of the VGT may be increased with an increase in at least one of the engine speed and the exhaust pressure, and the aspect ratio of the VGT may be decreased with a decrease in at least one of the engine speed and the exhaust pressure.

At 424, at least one of the VGT geometry, wastegate valve position, and the EGR valve positions may be adjusted based on the controller output. By increasing the opening of the VGT vanes, VGT aspect ratio may be increased causing reduction in exhaust pressure spikes (more surface area for exhaust expansion) with little effect on intake manifold pressure. By increasing EGR opening, the flow of exhaust from the exhaust manifold to the intake manifold may be increased, thereby reducing exhaust pressure. Likewise, by increasing wastegate valve opening, a flow of exhaust towards the tailpipe bypassing the turbine may be increased, thereby reducing exhaust pressure.

During a first boosted engine operating condition, a VGT vane actuator may be adjusted in response to a higher than a first threshold pressure difference between an exhaust and an intake manifold; during a second boosted engine operating condition, in response to the higher than a first threshold pressure difference between the exhaust and the intake manifold, an EGR valve may be adjusted, and during a third boosted engine operating condition, a wastegate valve may be adjusted responsive to the pressure difference exceeding the first threshold; and during each of the first, second, and third conditions, a boost pressure may be maintained. Also, during a fourth boosted engine operating condition, each of the VGT vane actuator, the EGR valve, and the wastegate valve may be adjusted responsive to a higher than a second threshold pressure difference between the exhaust and the intake manifold. Alternatively, during all four engine operating conditions, the adjusting may be based on a ratio of exhaust manifold pressure to intake manifold pressure. In one example, the first condition includes engine operation close to combustion stability limit, the second condition includes operation of a compressor coupled to the VGT at a compressor surge or choke limit, and the third condition includes the pressure difference between an exhaust and an intake manifold increasing to higher than the second threshold.

In this way, a control system may regulate (reduce) the pressure difference between the exhaust and intake manifold by adjusting VGT geometry and/or EGR valve position, thereby reducing engine pumping work and hardware degradation. Instead of using a difference in exhaust and intake pressure for scheduling VGT vane position, wastegate valve opening, and/or EGR valve opening, in one example, a ratio between exhaust and intake pressure may be used by the control system. In another example, only exhaust pressure may be used for controlling exhaust pressure spikes.

FIG. 5 shows an example operating sequence 500 illustrating an example control of pressure difference between exhaust and intake manifold based on a variable geometry turbine (VGT) and exhaust gas recirculation (EGR) valve position adjustment. As such, this operating sequence may be carried out during transient engine operations, in order to reduce a pressure difference between the exhaust and intake manifold pressure caused by exhaust pressure spikes. By reducing the pressure difference, engine pumping work may be reduced. The horizontal axis (x-axis) denotes time and the vertical markers t1-t9 identify significant times in the operation of sequence 500.

The first plot, line 502, from the top shows variation in accelerator pedal position over time. The second plot, line 504, shows a difference (ΔP) between exhaust and intake manifold pressure. An estimate of the intake pressure may be obtained from an intake manifold pressure sensor and an estimate of the exhaust pressure may be obtained from an exhaust manifold pressure sensor and the difference between the two estimates may be computed by an engine controller. Dotted lines 505 and 507 show a first and second lower threshold values of pressure difference ΔP, respectively. In order for the engine to operate optimally, without excessive pumping losses, the pressure difference ΔP may be maintained at a level lower than the first threshold 505 (close to zero). The third plot, line 506, shows the variation in exhaust pressure over time. During transient engine operations, there may be spikes in exhaust pressure which also affect the pressure difference ΔP. The fourth plot, line 508, shows a position of a VGT vanes and the fifth plot, line 510, shows a position of an EGR valve (opening).

Prior to time t1, the pedal position is observed to be constant without any significant fluctuation. During this time, the exhaust pressure and the pressure difference ΔP is also maintained at a steady level and the pressure difference ΔP is well below the first threshold 505. The VGT vanes is maintained at a constant position based on a boost pressure desired for engine operation. Also, during this time, the EGR valve opening is kept constant based on the EGR level desired for current engine operation.

At time t1, a tip-in event is detected by the change in accelerator pedal position. During such transient operations of the engine as during the tip-in event, the exhaust pressure increases within a short time, thereby causing exhaust pressure spikes. However it may take a longer time for the intake pressure to increase (due to large volume of the intake manifold compared to the exhaust manifold). Also, the intake pressure spikes may be smaller compared to the exhaust pressure spikes occurring due to the same tip-in event. Due to the tip-in event, at time t2, a spike is observed in exhaust pressure. As a consequence, the pressure difference ΔP may increase to a level above the first threshold 505 (but below second threshold 507). A higher than threshold pressure difference ΔP may result in an increase in engine pumping work which may in turn adversely affect engine efficiency, performance and fuel economy. Also during this time, the expansion ratios of the turbine may increase excessively which may cause damage to the turbocharger hardware. In addition, such exhaust pressure spikes and high expansion ratios may lead to high cycle fatigue and eventually degradation of turbocharger hardware.

Therefore, in order to decrease the exhaust pressure spike and decrease pressure difference ΔP, at time t2, the VGT vane actuator may be adjusted. In this example, the VGT vanes may be further opened in order to increase the VGT aspect ratio such that there is a reduction in exhaust pressure as exhaust flows through an increased surface area of the VGT vanes. A proportional-integral (PI) controller and a proportional-derivative (PD) controller may be used in combination to determine a desired adjustment of the VGT vane opening in order to reduce the pressure difference between the exhaust and intake manifold. The controller may send a signal to an actuator coupled to the VGT vanes in order to adjust the VGT geometry.

The PI controller may receive signals including engine speed, fueling schedule, intake and exhaust manifold pressure and the PD controller may receive signals including pressure difference ΔP, intake and exhaust manifold pressure, and engine speed from the respective sensors, and these signals may be utilized to schedule an adjustment for the VGT vane position. Further, adjustments to VGT geometry may be further carried out taking into account the corresponding compressor choke and surge limits. Based on engine operating parameters, extent of exhaust pressure reduction requested, VGT vane position, and EGR valve position, it may be determined by the controller that the EGR valve opening may be maintained at the same position and only VGT vane actuator adjustments may suffice to reduce the exhaust pressure spike and pressure difference ΔP. As such, EGR levels are dependent on engine operating parameters and higher than desired EGR flowrate may result in over dilution of intake air causing combustion instability. Also, as the pressure difference ΔP is lower than the second threshold 507, the change in pressure required to reduce the exhaust spike and the pressure difference ΔP may be provided by solely adjusting the VGT geometry.

Between time t2 and t3, the VGT vane opening may be maintained at the increased level. Also, based on the adjustments made to the VGT geometry, during this time, there is a reduction in exhaust pressure and pressure difference ΔP. Due to the change in VGT geometry, the intake pressure also decreases however at a lower rate compared to the rate of decrease in corresponding exhaust pressure. At time t3, it may be observed that the tip-in event has come to an end and the pedal position has returned to a stable level. Also, there is a reduction in exhaust pressure and pressure difference ΔP to a level higher than the first threshold 505. In response to the reduction in exhaust pressure and pressure difference ΔP, the VGT geometry may be further adjusted taking into current the current pressure levels (intake and exhaust manifold pressure) and other engine operating conditions. In this example, at this time, VGT vanes may be closed to an extent (compared to the VGT geometry during time period t2 and t3) such that there is a reduction in the surface area of the VGT vanes exposed to the exhaust.

Between time t3 and t4, there is no significant variation in the pedal position. Also, during this time, the exhaust pressure and the pressure difference ΔP is also maintained at a steady level and the pressure difference ΔP is well below the first threshold 505. Therefore, each of the VGT and the EGR valves are maintained at a constant position based on current engine operating parameters.

At time t4, a second tip-in event may be detected by the change in accelerator pedal position. As a consequence, a spike may be observed in exhaust pressure and the pressure difference ΔP may increase to a level above the first threshold 505 (but below second threshold 507). Therefore, in order to decrease the exhaust pressure spike and pressure difference ΔP, at time t5, the EGR valve opening may be adjusted. In this example, by increasing the opening of the EGR valve, airflow from the exhaust manifold to the intake manifold may be increased thereby causing a reduction in exhaust pressure. The proportional-integral (PI) controller and the proportional-derivative (PD) controller may be used together to determine the required adjustment to be carried out to the EGR valve opening in order to reduce the pressure difference between the intake and exhaust manifold. The controller may send a signal to an actuator coupled to the EGR valve to increase the valve opening.

The PI controller may receive signals including engine speed, fueling schedule, EGR flow rate, intake and exhaust manifold pressure and the PD controller may receive signals including pressure difference ΔP, intake and exhaust manifold pressure and engine speed from the respective sensors, and these signals may be utilized to schedule an adjustment for the EGR valve position. Based on current engine operating parameters, extent of exhaust pressure reduction requested, VGT geometry, and EGR valve position, it may be determined by the controller that at this time the VGT vanes may be maintained at the same position and only EGR valve adjustments may suffice to reduce the exhaust pressure spike and pressure difference ΔP. Also, as the pressure difference ΔP is lower than the second threshold 507, the change in pressure required to reduce the exhaust spike and the pressure difference ΔP may be provided by solely adjusting the EGR opening. It may be taken into account that change in pressure achieved by change in EGR opening is a faster process compared to the change in pressure accomplished by change in VGT vane position.

Between time t5 and t6, the EGR valve opening may be maintained at the increased level. Also, based on the adjustments made to the EGR valve opening, during this time, there is a reduction in exhaust pressure and pressure difference ΔP. Responsive to the change in EGR valve opening, intake pressure may first increase slightly and then decrease. This behavior depends on the operating region, and in some regions intake pressure response may be monotonic. At time t6, it may be observed that the tip-in event has come to an end and the pedal position has returned to a stable level. Also, there is a reduction in exhaust pressure and consequently, a decrease is observed in the pressure difference ΔP, to a level higher than the first threshold 505. In response to the reduction in exhaust pressure and pressure difference ΔP, the EGR opening may be further adjusted taking into account the current pressure levels (intake and exhaust manifold pressure) and other engine operating conditions. In this example, at this time, the opening of the EGR valve may be reduced to smaller extent (compared to the EGR valve opening during time period t5 and t6) in order to reduce exhaust flow from the exhaust manifold to the intake manifold.

Between time t6 and t7, the pedal is maintained at a constant position without any significant fluctuation. During this time, the exhaust pressure and the pressure difference ΔP is also maintained at a steady level and the pressure difference ΔP is well below the first threshold 505. Each of the VGT and EGR valves are maintained at a constant position based on current engine operation.

At time t7, a tip-out event is detected by the change in accelerator pedal position. Also during the tip-out event, at time t8, an exhaust pressure spike may be observed. As a consequence, the pressure difference ΔP may increase to a level even above the second threshold 507. A large value of pressure difference ΔP (higher than second threshold value 507) may result in a substantial increase in engine pumping work which may in turn adversely affect engine efficiency, performance and fuel economy. In addition, such exhaust pressure spikes may lead to high cycle fatigue and eventually degradation of several engine components.

Therefore, in order to decrease the exhaust pressure spike and pressure difference ΔP, at time t8, each of the VGT geometry and the EGR valve opening may be adjusted. Since at this time, the pressure difference ΔP is higher than the second threshold 507, adjustment to any one of VGT geometry and EGR opening may not be sufficient to increase the pressure difference ΔP. Therefore, at this time, adjustments may be made to each of the VGT geometry and the EGR opening. As before, the proportional-integral (PI) controller and the proportional-derivative (PD) controller may be used together to determine the required adjustment to be carried out to each of the VGT vane actuator and the EGR valve in order to increase the pressure difference between the intake and exhaust manifold to an optimal level. The controller may send a signal to respective actuators coupled to each of the VGT vanes and the EGR valve to increase the valve openings.

Between time t8 and t9, the VGT geometry and EGR valve opening may be maintained at the increased levels. Also, based on the adjustments made to both the VGT geometry and the EGR valve opening, during this time, there is a reduction in exhaust pressure and pressure difference ΔP. At time t9, it may be observed that the tip-out event has come to an end and the pedal position has returned to a stable level. Also, there is a reduction in exhaust pressure and consequently, a decrease is observed in the pressure difference ΔP. The pressure difference ΔP may decrease to a level lower than both second (507) and the first threshold (505). In response to the reduction in exhaust pressure and pressure difference ΔP, at time t9, the opening of the VGT vanes and the EGR valve may be reduced (compared to the VGT and EGR valve opening during time period t8 and t9) to the level as desired based on current engine operating parameters.

After time t9, there is no further change observed in the pedal. Also, the exhaust pressure and the pressure difference ΔP are maintained at a steady level well within the desired limits. Each of the VGT and EGR valves are maintained at a constant position based on current engine operation. In addition to a VGT geometry and EGR valve opening, a wastegate valve opening may also be adjusted in order to reduce the difference between the exhaust and intake manifold pressure. In this way, during transient engine operations, a pressure difference between the exhaust and intake manifold may be reduced to an optimal level via suitable adjustments made to at least one of VGT geometry and EGR valve position, thereby controlling engine pumping work.

In one example, a method for a boosted engine system comprises adjusting a variable geometry turbine (VGT) based on a difference between an exhaust pressure and an intake pressure to reduce the difference below a threshold. The preceding example method further comprises, additionally or optionally, while adjusting, maintaining a desired boost pressure, and wherein the adjusting is further based on one or more of air flow, exhaust flow, engine speed, engine speed combined with load, turbocharger speed, fueling, torque (load), exhaust pressure, and environmental conditions including ambient temperature and ambient pressure. In any or all of the preceding examples, additionally or optionally, the closed loop operating includes scheduling a gain for adjusting a VGT geometry based on each of the engine speed and exhaust pressure. In any or all of the preceding examples, additionally or optionally, the adjusting further includes changing an aspect ratio of the VGT based on the scheduled gain. In any or all of the preceding examples, additionally or optionally, the adjusting based on the scheduled gain includes, in a first mode, increasing the aspect ratio of the VGT with at least one of a decrease in the engine speed and an increase in the exhaust pressure, and decreasing the aspect ratio of the VGT with at least one of an increase in the engine speed and a decrease in the exhaust pressure; and in a second mode, increasing the aspect ratio of the VGT with an increase in at least one of the engine speed and the exhaust pressure, and decreasing the aspect ratio of the VGT with a decrease in at least one of the engine speed and the exhaust pressure. In any or all of the preceding examples, the adjusting is additionally or optionally responsive to the difference between the exhaust pressure and the intake pressure exceeding a first threshold. Any or all of the preceding examples further comprises, additionally or optionally, adjusting an exhaust gas recirculation (EGR) valve coupled to an EGR system based on the difference between the exhaust pressure and the intake pressure to reduce the difference below the threshold, the adjusting further based on each of the engine speed and the exhaust pressure, wherein adjusting the EGR valve includes increasing the EGR valve opening with at least one of a decrease in the engine speed and an increase in the exhaust pressure; and decreasing the valve opening with at least one of an increase in the engine speed and a decrease in the exhaust pressure. Any or all of the preceding examples further comprises, additionally or optionally, adjusting a wastegate valve coupled to a wastegate passage based on the difference between the exhaust pressure and the intake pressure to reduce the difference below the threshold, the adjusting further based on each of the engine speed, and the exhaust pressure, and wherein adjusting the wastegate valve includes increasing the wastegate valve opening with at least one of a decrease in the engine speed and an increase in the exhaust pressure, and decreasing the wastegate valve opening with at least one of an increase in the engine speed and a decrease in the exhaust pressure. Any or all of the preceding examples further comprises, additionally or optionally, adjusting each of the VGT geometry and the EGR valve responsive to the difference between the exhaust pressure and the intake pressure exceeding a second threshold, the second threshold higher than the first threshold. In any or all of the preceding examples, additionally or optionally, adjusting the EGR valve includes increasing the EGR valve opening with at least one of a decrease in the engine speed and an increase in the exhaust pressure; and decreasing the valve opening with at least one of an increase in the engine speed and a decrease in the exhaust pressure.

Another example method for an engine comprises during a first boosted engine operating condition, selectively adjusting a variable geometry turbine (VGT) valve vane actuators responsive to a pressure difference between an exhaust manifold and an intake manifold exceeding a first threshold; during a second boosted engine operating condition, selectively adjusting an exhaust gas recirculation (EGR) valve responsive to the pressure difference exceeding the first threshold; and during both the first and second conditions, maintaining a boost pressure during a third boosted engine operating condition, selectively adjusting a wastegate valve responsive to the pressure difference exceeding the first threshold; and during each of the first, second, and third conditions, maintaining a boost pressure. The preceding example method may additionally or optionally further comprise during a fourth boosted engine operating condition, adjusting each of the VGT vane actuator, the EGR valve, and the wastegate valve responsive to the pressure difference exceeding a second threshold, the second threshold higher than the first threshold, wherein during each of the first, second, and third conditions, the adjusting is further based on a ratio of exhaust manifold pressure to intake manifold pressure. In any or all of the preceding examples, additionally or optionally, the engine includes an intake compressor, wherein the first condition includes engine operation at or within a threshold distance of a combustion stability limit, and wherein the second condition includes compressor operation at or within the threshold distance of a compressor surge limit. In any or all of the preceding examples, additionally or optionally, adjusting the VGT vane actuator during the first condition and adjusting the EGR valve during the second condition includes adjusting with a gain, the gain based on each of an engine speed and an exhaust manifold pressure, the gain increased with at least one of a decrease in the engine speed and an increase in the exhaust manifold pressure. In any or all of the preceding examples, additionally or optionally, adjusting the VGT, EGR, or wastegate actuators includes adjusting with a first term based on a proportional integral (PI) controller, the first term based on engine speed, estimated intake manifold pressure, target intake manifold pressure, and estimated exhaust manifold pressure, and then adjusting with a second term based on a proportional derivative (PD) controller, the second term based on engine speed and a difference between the estimated exhaust manifold and the estimated intake manifold pressure. In any or all of the preceding examples, additionally or optionally, the selectively adjusting during the first condition includes actuating the VGT vane actuator to increase an opening the VGT vanes based on each of the first and the second term to increase an aspect ratio of the VGT, and wherein the selectively adjusting during the second condition includes opening the EGR valve based on each of the first and the second term to increase an opening of an EGR passage. In any or all of the preceding examples, additionally or optionally, the pressure difference between the exhaust manifold and the intake manifold is calculated based on an intake pressure estimate obtained from an intake manifold pressure sensor and an exhaust pressure estimate obtained from an exhaust manifold pressure sensor.

In yet another example, an engine including an intake manifold and an exhaust manifold; a turbocharger for providing a boosted aircharge to the engine, the turbocharger including a variable geometry exhaust turbine (VGT) driving an intake compressor, the exhaust turbine including vanes for varying an aspect ratio of the turbine; a wastegate passage coupled across the exhaust turbine, the wastegate passage including a wastegate valve; an exhaust gas recirculation (EGR) system including an exhaust gas recirculation passage with an EGR valve, the EGR passage recirculating exhaust gases from the exhaust manifold to the intake manifold; a first pressure sensor coupled to the intake manifold; a second pressure sensor coupled to the exhaust manifold; a controller with computer readable instructions stored on non-transitory memory for: while operating the engine with boost enabled, reducing a difference between an exhaust manifold pressure and an intake manifold pressure via adjustments to at least one of an aspect ratio of the exhaust turbine, an opening of the wastegate valve, and an opening of the exhaust gas recirculation valve. The preceding example further includes, additionally or optionally, reducing the difference between the exhaust manifold pressure and the intake manifold pressure includes increasing at least one of VGT vane opening, wastegate valve opening and EGR valve opening responsive to a higher than threshold increase in pressure difference between the exhaust manifold pressure and the intake manifold. In the preceding example, additionally or optionally, maintaining a higher than threshold difference includes increasing an opening of at least one of the VGT vanes and the EGR valve responsive to a lower than threshold pressure difference. In the preceding example, additionally or optionally, reducing the difference between the exhaust manifold pressure and the intake manifold pressure includes increasing an opening of at least one of the VGT vanes and the EGR valve responsive to a higher than threshold increase in pressure difference between the exhaust manifold pressure and the intake manifold. In any or all of the preceding examples, additionally or optionally, increasing at least one of VGT vane opening, wastegate valve opening and EGR valve opening includes calculating one or more control terms (e.g., gains) via at least one of a proportional integral (PI) controller, a proportional derivative (PD) controller and a proportional integral derivative (PID) controller based on engine speed, intake and exhaust manifold pressure, and operating at least one of VGT vane opening, wastegate valve opening and EGR valve opening according to the calculated gain. In any or all of the preceding examples, additionally or optionally, maintaining a higher than threshold difference includes adjusting at least one of the VGT vanes and the EGR valve based on the engine speed and the exhaust pressure wherein the opening of at least one of the VGT vanes and the EGR valve is increased as the engine speed decreases or the exhaust manifold pressure increases, and wherein the opening of at least one of the VGT vanes and the EGR valve is decreased as the engine speed increases or the exhaust manifold pressure decreases. In any or all of the preceding examples, additionally or optionally, reducing the difference between the exhaust manifold pressure and the intake manifold pressure includes adjusting at least one of the VGT vanes, the wastegate valve, and the EGR valve based on the engine speed and the exhaust pressure wherein at least one of the VGT vane position, the wastegate valve opening and the EGR valve opening is increased as the engine speed decreases or the exhaust manifold pressure increases, and wherein at least one of the VGT vane position, the wastegate valve opening and the EGR valve opening is decreased as the engine speed increases or the exhaust manifold pressure decreases.

In a further representation, a method for an engine comprises adjusting a variable geometry turbine (VGT) based on a difference between an exhaust pressure and an intake pressure to maintain a desired boost pressure. In the preceding example, additionally or optionally, the adjusting is further based on each of engine speed, and exhaust pressure. Any or all of the preceding examples further comprises, additionally or optionally, adjusting an exhaust gas recirculation (EGR) valve coupled to an EGR system based on the difference between the exhaust pressure and the intake pressure to maintain the desired boost pressure, the adjusting further based on each of the engine speed and the exhaust pressure, wherein adjusting the EGR valve includes increasing the EGR valve opening with at least one of a decrease in the engine speed and an increase in the exhaust pressure; and decreasing the valve opening with at least one of an increase in the engine speed and a decrease in the exhaust pressure. Any or all of the preceding examples further comprises, additionally or optionally, adjusting a wastegate valve coupled to a wastegate passage based on the difference between the exhaust pressure and the intake pressure to maintain the desired boost pressure, the adjusting further based on each of the engine speed, and the exhaust pressure, and wherein adjusting the wastegate valve includes increasing the wastegate valve opening with at least one of a decrease in the engine speed and an increase in the exhaust pressure, and decreasing the wastegate valve opening with at least one of an increase in the engine speed and a decrease in the exhaust pressure. In another example, adjusting each of a VGT vane geometry, EGR valve opening and wastegate valve position with the gain includes adjusting with a first term based on a proportional integral (PI) controller, the first term based on engine speed, estimated intake manifold pressure, and exhaust manifold pressure, and then adjusting with a second term based on a proportional derivative (PD) controller, the second term based on engine speed and exhaust manifold pressure. In yet another example, increasing at least one of VGT vane opening, wastegate valve opening and EGR valve opening includes scheduling a gain via at least one of a proportional integral (PI) controller, a proportional derivative (PD) controller and a proportional integral derivative (PID) controller based on engine speed, intake and exhaust manifold pressure. In this way, each of a VGT geometry and an EGR valve opening may be effectively adjusted in order to maintain an optimal pressure difference between an intake and an exhaust manifold of the engine. By maintaining the pressure difference at an optimal level, engine pumping losses may be reduced. In addition, exhaust pressure spikes and excessive expansion ratios may be avoided thereby enhancing engine performance and fuel efficiency. The technical effect of reducing engine pumping losses, exhaust pressure spikes, and excessive expansion ratios is that damage to turbocharger and other hardware components due to fatigue may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine system comprising:
adjusting, via an engine controller, a variable geometry turbine (VGT) based on a difference between an exhaust pressure and an intake pressure to reduce the difference below a threshold difference, the difference determined via the engine controller based on signals from an exhaust pressure sensor and an intake manifold air pressure sensor; and
adjusting, via the engine controller, an exhaust gas recirculation (EGR) valve coupled to an EGR system based on the difference between the exhaust pressure and the intake pressure to reduce the difference, the adjusting the EGR valve further based on each of an engine speed, determined based on a crankshaft sensor, and the exhaust pressure;
wherein adjusting the EGR valve includes increasing an EGR valve opening with at least one of a decrease in the engine speed and an increase in the exhaust pressure, and decreasing the EGR valve opening with at least one of an increase in the engine speed and a decrease in the exhaust pressure;
wherein the exhaust pressure sensor is positioned in an exhaust passage between the VGT and an emission control device; and
wherein the adjusting is responsive to the difference between the exhaust pressure and the intake pressure exceeding a first threshold.

2. The method of claim 1, further comprising, while adjusting the VGT, maintaining a desired boost pressure, and wherein the adjusting the VGT is further based on one or more of air flow, exhaust flow, engine speed, engine speed combined with load, turbocharger speed, fueling, and torque (load), each determined via the engine controller, wherein the air flow is determined based on an air flow sensor, the exhaust flow is determined based on one or more of a pressure sensor, a temperature sensor, a humidity sensor, and an air-fuel ratio sensor, and the load is based on an accelerator pedal position.

3. The method of claim 1, further comprising, closed loop adjusting the VGT based on each of the engine speed, the exhaust pressure, and the difference between the exhaust pressure and the intake pressure as well as based on a set-point boost pressure as compared to the intake pressure, wherein the set-point boost pressure is based on a look-up table receiving the engine speed and fueling as inputs.

4. The method of claim 3, wherein the closed loop adjusting includes scheduling a gain, via the engine controller, for adjusting the VGT based on each of the engine speed and the exhaust pressure, the adjusting further including changing an aspect ratio of the VGT based on the scheduled gain.

5. The method of claim 4, wherein the adjusting based on the gain includes, in a first mode, increasing the aspect ratio of the VGT with at least one of a decrease in the engine speed and an increase in the exhaust pressure, and decreasing the aspect ratio of the VGT with at least one of an increase in the engine speed and a decrease in the exhaust pressure; and
in a second mode, increasing the aspect ratio of the VGT with an increase in at least one of the engine speed and the exhaust pressure, and decreasing the aspect ratio of the VGT with a decrease in at least one of the engine speed and the exhaust pressure.

6. The method of claim 4, further comprising, adjusting each of the aspect ratio of the VGT and the EGR valve responsive to the difference between the exhaust pressure and the intake pressure exceeding a second threshold, the second threshold higher than the first threshold.

7. The method of claim 1, further comprising, adjusting a wastegate valve coupled to a wastegate passage based on the difference between the exhaust pressure and the intake pressure to reduce the difference, the adjusting further based on each of the engine speed and the exhaust pressure, and wherein adjusting the wastegate valve includes increasing a wastegate valve opening with at least one of a decrease in the engine speed and an increase in the exhaust pressure, and decreasing the wastegate valve opening with at least one of an increase in the engine speed and a decrease in the exhaust pressure.

8. A method for an engine, comprising:
during a first boosted engine operating condition, selectively adjusting a variable geometry turbine (VGT) vane actuator responsive to a pressure difference between an exhaust pressure and an intake pressure exceeding a first threshold, the pressure difference determined via a controller, based on signals from an exhaust pressure sensor coupled to an exhaust passage and an intake manifold air pressure sensor coupled to an intake manifold;
during a second boosted engine operating condition, selectively adjusting an exhaust gas recirculation (EGR) valve responsive to the pressure difference exceeding the first threshold;
during a third boosted engine operating condition, selectively adjusting a wastegate valve responsive to the pressure difference exceeding the first threshold; and
during each of the first, second, and third conditions, maintaining a boost pressure;
wherein the first boosted engine operating condition is different from the second and third boosted engine operating conditions; and
wherein the second boosted engine operating condition is different from the third boosted engine operating condition.

9. The method of claim 8, further comprising, during a fourth boosted engine operating condition, adjusting each of the VGT vane actuator, the EGR valve, and the wastegate valve responsive to the pressure difference exceeding a second threshold, the second threshold higher than the first threshold, wherein during each of the first, second, and third conditions, the adjusting is further based on a ratio of exhaust pressure determined via the controller, based on a signal from the exhaust pressure sensor to intake manifold pressure determined via the controller, based on a signal from the intake manifold air pressure sensor.

10. The method of claim 8, wherein adjusting the VGT vane actuator during the first condition and adjusting the EGR valve during the second condition includes adjusting with a gain, the gain based on each of an engine speed and an exhaust pressure, the gain increased with at least one of a decrease in the engine speed and an increase in the exhaust pressure.

11. The method of 8, wherein adjusting each of the VGT vane actuator and the EGR valve includes adjusting with a first term based on a proportional integral (PI) controller, the first term based on engine speed, estimated intake manifold pressure, target intake manifold pressure, and estimated exhaust pressure, and then adjusting with a second term based on a proportional derivative (PD) controller, the second term based on engine speed, estimated exhaust pressure, and a difference between the estimated exhaust pressure and the estimated intake manifold pressure.

12. The method of claim 11, wherein the selectively adjusting during the first condition includes actuating the VGT vane actuator to increase an opening of VGT vanes based on each of the first and the second term, and wherein the selectively adjusting during the second condition includes opening the EGR valve based on each of the first and the second term to increase an opening of an EGR passage.

13. An engine system, comprising:
an engine including an intake manifold and an exhaust manifold;
a turbocharger for providing a boosted aircharge to the engine, the turbocharger including a variable geometry exhaust turbine (VGT) driving an intake compressor, the VGT including vanes for varying an aspect ratio of the VGT;
a wastegate passage coupled across the VGT, the wastegate passage including a wastegate valve;
an exhaust gas recirculation (EGR) system including an EGR passage with an EGR valve, the EGR passage recirculating exhaust gases from the exhaust manifold to the intake manifold;
a first pressure sensor coupled to the intake manifold;
a second pressure sensor positioned in an exhaust passage between the VGT and an emission control device; and
a controller with computer readable instructions stored on non-transitory memory for:
while operating the engine with boost enabled,
reducing a difference between an exhaust manifold pressure and an intake manifold pressure via adjustments to at least one of the aspect ratio of the VGT, an opening of the wastegate valve, and an opening of the EGR valve.

14. The system of claim 13, wherein reducing the difference between the exhaust manifold pressure and the intake manifold pressure includes increasing at least one of VGT vane opening, wastegate valve opening, and EGR valve opening responsive to a higher than threshold increase in the difference between the exhaust manifold pressure and the intake manifold pressure.

15. The system of claim 14, wherein increasing at least one of VGT vane opening, wastegate valve opening, and EGR valve opening includes calculating one or more control terms via at least one of a proportional integral (PI) controller, a proportional derivative (PD) controller, and a proportional integral derivative (PID) controller based on engine speed, intake and exhaust manifold pressure, and operating at least one of VGT vane opening, wastegate valve opening, and EGR valve opening according to a calculated gain.

16. The system of claim 15, wherein reducing the difference between the exhaust manifold pressure and the intake manifold pressure includes adjusting at least one of the VGT vanes, the wastegate valve, and the EGR valve based on the engine speed and the exhaust manifold pressure wherein at least one of VGT vane position, the wastegate valve opening, and the EGR valve opening is increased as the engine speed decreases or the exhaust manifold pressure increases, and wherein at least one of the VGT vane position, the wastegate valve opening, and the EGR valve opening is decreased as the engine speed increases or the exhaust manifold pressure decreases.

* * * * *